US008830636B2

(12) United States Patent
Asplund et al.

(10) Patent No.: US 8,830,636 B2
(45) Date of Patent: Sep. 9, 2014

(54) HIGH VOLTAGE DC SWITCHYARD WITH SEMICONDUCTOR SWITCHES

(75) Inventors: Gunnar Asplund, Solna (SE); Jurgen Häfner, Ludvika (SE)

(73) Assignee: ABB Technology AG, Zürich (CH)

( * ) Notice: Subject to any disclaimer, the term of this patent is extended or adjusted under 35 U.S.C. 154(b) by 123 days.

(21) Appl. No.: 13/697,264

(22) PCT Filed: May 11, 2010

(86) PCT No.: PCT/EP2010/056464
§ 371 (c)(1),
(2), (4) Date: Nov. 9, 2012

(87) PCT Pub. No.: WO2011/141053
PCT Pub. Date: Nov. 17, 2011

(65) Prior Publication Data
US 2013/0050888 A1  Feb. 28, 2013

(51) Int. Cl.
*H02H 3/00* (2006.01)
*H02H 7/26* (2006.01)
*H02J 3/36* (2006.01)
*H02B 1/20* (2006.01)

(52) U.S. Cl.
CPC .. *H02J 3/36* (2013.01); *Y02E 60/60* (2013.01); *H02B 1/20* (2013.01); *H02H 7/268* (2013.01)
USPC ............................................. 361/8; 361/62

(58) Field of Classification Search
USPC ................................. 361/8, 12, 62
See application file for complete search history.

(56) References Cited

U.S. PATENT DOCUMENTS

| 5,115,389 | A | 5/1992 | Ouchi et al. |
| 5,999,388 | A | 12/1999 | Asplund |
| 8,687,389 | B2 * | 4/2014 | Dommaschk et al. .......... 363/53 |
| 2003/0183838 | A1 | 10/2003 | Huang et al. |
| 2004/0027734 | A1 * | 2/2004 | Fairfax et al. ..................... 361/2 |
| 2008/0143462 | A1 | 6/2008 | Belisle et al. |
| 2010/0043641 | A1 | 2/2010 | Thome |

FOREIGN PATENT DOCUMENTS

EP  0 867 998 A1  9/1998
GB  1 520 884  8/1978

OTHER PUBLICATIONS

"IEEE Guide for Specification of High-Voltage Direct-Current Systems. Part I—Steady-State Performance", ANSI/IEEE Standard 1030-1987, 1988, 57 pages.
Cuzner, R.M. et al., "The Status of DC Micro-Grid Protection", IEEE, 2008, pp. 1-8.
Krstic, S. et al., "Circuit Breaker Technologies for Advanced Ship Power Systems", IEEE, 2007, pp. 201-208.

* cited by examiner

*Primary Examiner* — Danny Nguyen
(74) *Attorney, Agent, or Firm* — Birch, Stewart, Kolasch & Birch, LLP

(57) ABSTRACT

A high voltage DC switchyard comprises at least one busbar, at lest two DC lines connected to said at least one busbar through DC breakers comprising a section of at least one semiconductor device of turn-off type and rectifying member in anti-parallel therewith. At least one said DC line is connected to at least one said busbar through a unidirectional said DC breaker, i.e. a DC breaker that may only block current therethrough in one direction.

21 Claims, 3 Drawing Sheets

HIGH VOLTAGE DC SWITCHYARD WITH SEMICONDUCTOR SWITCHES

FIELD OF THE INVENTION AND BACKGROUND ART

The present invention relates to a high voltage DC switchyard comprising
- at least one busbar,
- at least two DC lines each connected to said at least one busbar through DC breakers comprising a section of at least one semiconductor device of turn-off type and a rectifying member connected in anti-parallel therewith,
- means configured to detect occurrence of a fault current in connection with said busbar or DC lines, and
- a control unit configured to control said DC breakers for protecting equipment connected to said busbar and/or DC lines upon occurrence of a said fault current.

High voltage means a voltage ≥10 kV and often a voltage of several hundreds kV with respect to ground.

Such a DC switchyard is used for interconnecting high voltage DC lines. This may for instance be done for forming a DC transmission network or for just interconnecting long High Voltage Direct Current transmission lines, which may be overhead lines and/or cables. AC/DC converters may be included in the switchyard and have a DC side thereof connected to said busbars for also connecting an alternating voltage network or a generator of electric power to the DC switchyard. The number of DC lines connected to such a DC switchyard may be any conceivable, although two and four are shown in the Figures of this disclosure.

One possible configuration of such a DC switchyard in the form of a one and a half breaker switchyard is schematically illustrated in appended FIG. 1, in which three DC breakers 1-3 and 4-6 are arranged per two DC lines 7, 8 and 9, 10, respectively, for connecting these DC lines to the two busbars 11, 12 of the switchyard.

Another possible configuration of such a switchyard in the form of a so-called two breaker switchyard also having two busbars is schematically illustrated in appended FIG. 2. This switchyard has each DC line 20, 21 connected through two individual DC breakers 22, 23 and 24, 25, respectively, to a redundant system of busbars 26, 27.

The DC breakers of such switchyards are arranged for breaking fault currents occurring as a consequence of faults within the switchyard or in the DC lines connected thereto for isolating the fault and protecting other parts of the power transmission system. It is then of great importance to be able to at a very short notice, such as in the order of a few 100 µs, upon occurrence of such a fault limit this fault current for preventing severe impacts upon equipment connected to the system, which is the reason for using semiconductor devices of turn-off type, which may open within a few µs, as switches in such DC breakers.

However, such semiconductor devices of turn-off type, such as IGBT:s (Insulated Gate Bipolar Transistor), of standard design are not able to block negative voltages. A bidirectional such DC breaker based on standard IGBT:s without reverse blocking capability is shown in FIG. 3 and is composed of two said sections each including an IGBT 30, 31 and an anti-parallel diode 32, 33, which are connected in series with opposite current direction. It is noticed that for each current direction the current will pass through one IGBT and one diode, which will result in conduction losses in the IGBT and in the diode, in which the losses in the diode will be approximately 50% to 70% compared to the on-state losses in the IGBT. Furthermore, a large number of series connected bidirectional IGBT current switches shown in FIG. 3 is required to form a bidirectional high voltage DC breaker together with a parallel connected common arrester bank for current limitation not shown in the Figure.

SUMMARY OF THE INVENTION

The object of the present invention is to provide a high voltage DC switchyard of the type defined in the introduction being improved in at least some aspect with respect to such switchyards already known.

This object is according to the invention obtained by providing such a switchyard, in which at least one said DC line is connected to at least one said busbar through a unidirectional said DC breaker, e.g. a DC breaker that may only block current therethrough in one direction.

The present inventors have realized that it is possible to obtain the same functionality of a high voltage DC switchyard with not all DC breakers being bidirectional as is required for a conventional AC switchyard. This means a reduction of the number of the semiconductor devices of turn-off type, such as IGBT:s, for such a DC breaker with respect to a bidirectional DC breaker, and it is the number of such semiconductor devices in such DC breakers that determines the costs and losses of a DC switchyard.

According to an embodiment of the invention each said DC line is connected to at least one said busbar through a said unidirectional said DC breaker. This does not limit the functionality of the DC switchyard but results in a considerable reduction of costs and conduction losses of the switchyard.

According to another embodiment of the invention the DC switchyard has two busbars and is a one and a half breaker switchyard having three said DC breakers per two said DC lines, a first DC breaker connecting a first of the DC lines to a first of said busbars, a second DC breaker connecting a second of the DC lines to a second of said busbars and a third DC breaker in a current path interconnecting the first and second DC breakers, and the first and second DC breakers are said unidirectional DC breakers. This constitutes one advantageous alternative to realizing a DC switchyard according to the invention with said reduction of costs and losses with respect to a switchyard having only bidirectional DC breakers without limiting the functionality of the switchyard.

According to another embodiment of the invention being a further development of the embodiment last mentioned said first and second DC breakers have the semiconductor devices thereof directed to conduct in the direction towards the first and second busbar, respectively, and said control unit is configured to control said first or second DC breaker to open for disconnecting the respective DC line from the respective busbar in the case of occurrence of a fault of that busbar. Thus, said unidirectional DC breakers may be used to disconnect the respective DC line in the case of a fault of the respective busbar.

According to another embodiment of the invention said DC breakers connecting the DC lines to a said busbar have their semiconductor devices directed to conduct away from said busbar, and said control unit is configured to control these DC breakers to open for disconnecting said busbar in the case of a fault of a line connected to that busbar through this DC breaker. Thus, said unidirectional DC breakers of such a DC switchyard may be used to disconnect a busbar in the case of a fault of a line connected to that busbar.

According to another embodiment of the invention said third DC breaker is a bidirectional DC breaker having at least two said sections connected in series and with semiconductor devices thereof with opposite conducting directions. This makes it possible to disconnect any of the DC lines or busbars from the other DC line and busbar upon occurrence of a DC line or busbar fault or internal fault of the DC switchyard.

According to another embodiment of the invention said DC switchyard has only one busbar in the form of a DC grid node to which at least three said DC lines are connected through a said DC breaker each with a semiconductor device of these DC breakers directed to conduct away from said busbar. Said control unit may then be configured to control the respective DC breaker to open in the case of a fault occurring in one of said DC lines connected to said DC grid node.

According to another embodiment of the invention said DC switchyard has two busbars and is a two breaker switchyard having for each said DC line a separate connection to each of said two busbars through one said unidirectional DC breaker with the semiconductor devices thereof directed to conduct towards the busbar, and said two connections are connected to said DC line through a further unidirectional DC breaker in common with the semiconductor devices thereof directed to conduct away from the busbars towards the DC-line. Thus, such a DC switchyard has only unidirectional DC breakers resulting in a reduction of the number of semiconductor devices of turn-off type with 25% with respect to a two breaker switchyard with a conventional configuration and having bidirectional DC breakers.

Furthermore, said control unit is configured to control said further unidirectional DC breaker in common to open for disconnecting the DC line from the DC switchyard upon occurrence of a fault of that DC line, and said unit is configured to control said unidirectional DC breaker of one of said two connections to open for disconnecting a said busbar associated with that connection upon occurrence of a fault of that busbar, which constitutes further embodiments of the invention.

According to another embodiment of the invention the DC switchyard comprises an AC/DC converter, such as a Voltage Source Converter, with the DC-side thereof connected to a mid point of a current path interconnecting said two busbars and connected to these busbars through a said DC breaker each on opposite sides of said mid point in said current path.

According to another embodiment of the invention said DC breakers connecting said converter to the busbars are unidirectional DC breakers with the semiconductor devices thereof directed to conduct towards the respective busbar, and the control unit is configured to control the respective DC breaker to open for disconnecting the converter from a busbar upon occurrence of a fault of that busbar.

According to another embodiment of the invention said DC breakers connecting the converter to the respective busbar are bidirectional DC breakers.

According to another embodiment of the invention each said section of said DC breakers has a plurality of said semiconductor devices connected in series and jointly controllable through said control unit. In the case of very high voltages, such as above 100 kV, within the DC switchyard with respect to ground it is suitable and sometimes even necessary to have a comparative high number, such as well ten or more, semiconductor devices connected in series for obtaining proper function aimed at of a said DC breaker. When these semiconductor devices are jointly controllable they will act as one single semiconductor device, i.e. switch.

According to another embodiment of the invention said semiconductor device/devices is/are an IGBT/IGBT:s, a GTO/GTO:s or an IGCT/IGCT:s. Such Insulated Gate Bipolar Transistors, Gate Turn-Off thyristors and Integrated Gate Commutated Thyristors are suitable semiconductor devices of turn-off type for DC breakers in a high voltage DC switchyard.

According to another embodiment of the invention the switchyard is configured to interconnect DC lines intended to be on a voltage level of ≥10 kV, 10 kV-1000 kV, 100 kV-1000 kV or 300 kV-1000 kV with respect to ground.

The invention also relates to a plant for transmitting electric power through High Voltage Direct Current, which is characterized in that it is provided with at least one DC switchyard according to the present invention. Such a plant may benefit from the positive features mentioned above of a said high voltage DC switchyard.

Further advantages as well as advantageous features of the invention will appear from the following description.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
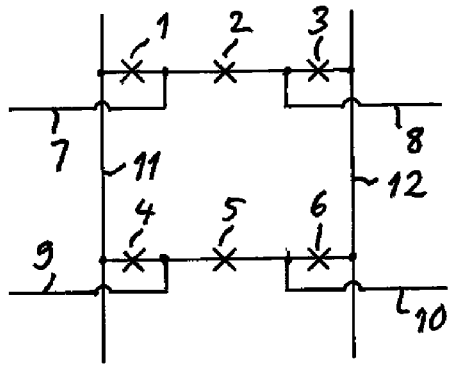
FIGS. 1 and 2 are very schematical views illustrating two different known switchyard configurations.
Figure 2:
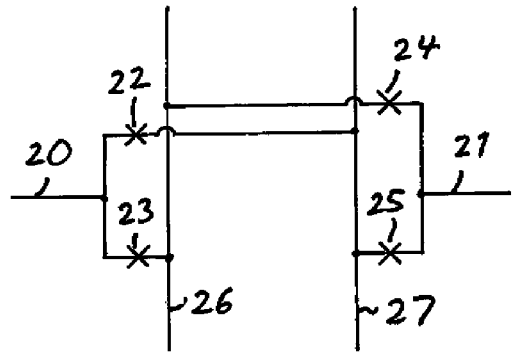
Figure 3:
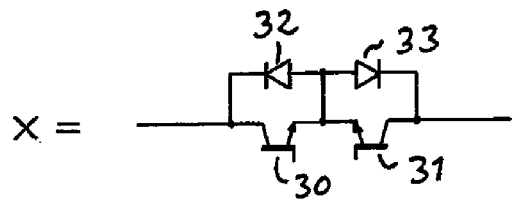
FIG. 3 is a simplified view illustrating a possible design of a bidirectional DC breaker.
Figure 4:
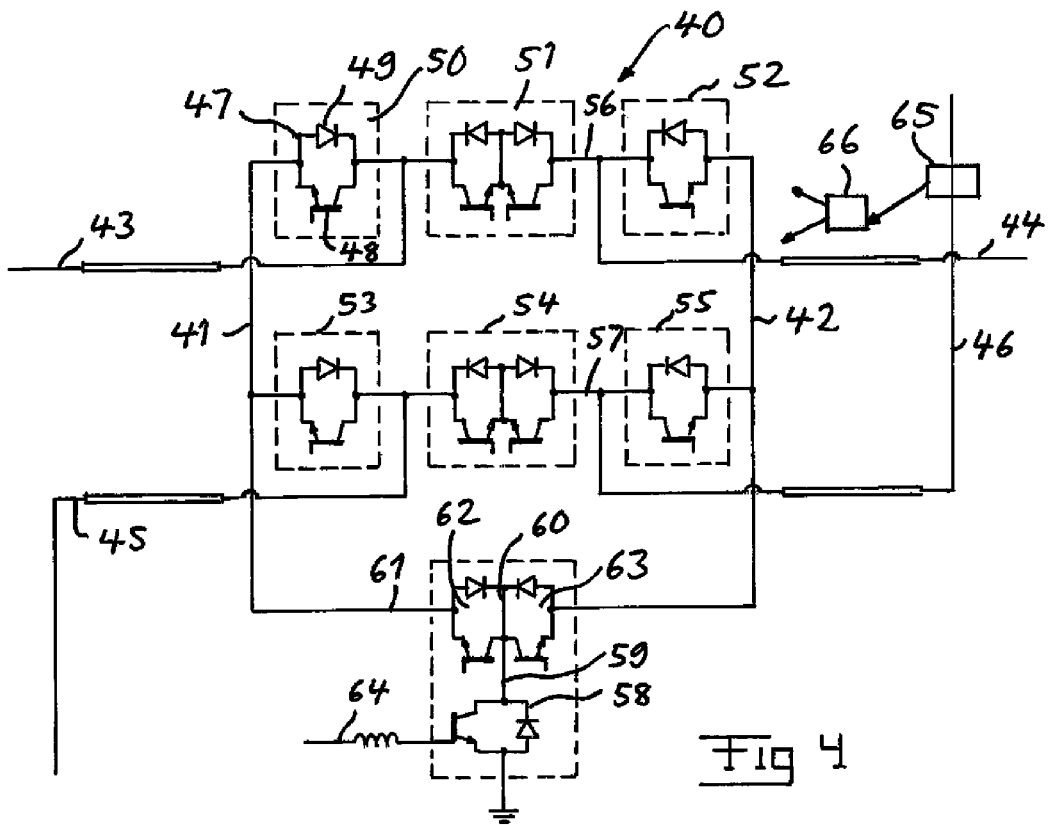
FIG. 4 is a schematic view illustrating a high voltage DC switchyard according to a first embodiment of the invention.

A high voltage DC switchyard 40 according to a first embodiment of the invention is schematically illustrated in FIG. 4, and it is pointed out that only components of the switchyard of importance for the present invention are shown and that the switchyard of course includes many other components, such as for instance power dissipating arresters an/or resistors being a part of the DC breakers as well as current limiting reactors and voltage limiting arresters.

It is shown how the switchyard has two busbars, a first busbar 41 and a second busbar 42. Four DC lines 43-46 are connected to each of these busbars through DC breakers comprising a section 47 of at least one semiconductor device 48 of turn-off type and a rectifying member 49 in the form of a rectifying diode connected in anti-parallel therewith.

More exactly, this switchyard is a one and a half breaker switchyard having three DC breakers 50-52 and 53-55 per two said DC lines 43, 44 and 45, 46, respectively. For each such couple of DC lines 43, 44 and 45, 46 the following applies: a first DC breaker 48, 53 connects a first 43, 45 of the DC lines to a first 41 of the busbars, a second DC breaker 52, 55 connects a second 44, 46 of the DC lines to a second 42 of the busbars, and a third DC breaker 51, 54 in a current path 56, 57 interconnects the first and second DC breakers. The first 48, 53 and second 52, 55 DC breakers are unidirectional DC breakers, i.e. a DC breaker that may only block current therethrough in one direction. These first and second DC breakers have the semiconductor devices 48 thereof directed to conduct in the direction towards the first and second busbar, respectively.

The DC switchyard also comprises an AC/DC converter 58, here in the form of a Voltage Source Converter, with a DC-side 59 thereof connected to a mid point 60 of a current path 61 interconnecting said two busbars 41, 42 and connected to these busbars through a unidirectional DC breaker 62, 63 each on opposite sides of said mid point in said current path. The DC breakers 62, 63 have the semiconductor devices thereof directed to conduct towards the respective busbar 41, 42. The alternating voltage side 64 of the converter may be connected to an alternating voltage network or a generator of a plant generating electric power, such as a wind power plant.

The switchyard also includes means 65, here only schematically indicated through a box, configured to detect occurrence of a fault current in connection with said busbars or DC lines, i.e. within the DC switchyard or in lines or equipment connected thereto. The switchyard has also a control unit 66 configured to control the DC breakers of the switchyard for protecting equipment connected to said busbars and/or DC lines upon occurrence of a said fault current.

The function of a switchyard according to FIG. 4 will now be described. The unidirectional DC breakers 50, 52, 53, 55 between outgoing DC lines and the station busbars are able to disconnect the lines in the case of a busbar fault. The unidirectional DC breakers connecting the converter 58 to the busbars are able to disconnect the converter in the case of a busbar fault.

In the case of a DC line fault, e.g. of the line 43 connected through the unidirectional DC breaker 50 to the busbar 41, the bidirectional DC breaker 51 and the unidirectional DC breakers 53 and 62 are opened to disconnect the other DC lines and the converter from the faulty line. Thereafter, it is possible to open the DC line sided mechanical disconnectors not shown of the unidirectional DC breaker 50 and to reclose the unidirectional DC breakers 53 and 62. A similar protection scheme shall be applied for the other lines and controlled through said control unit 66.

In the case of a busbar fault all DC breakers connected to the faulty busbar shall be opened. Disconnection of the converter and DC lines is not required due to the redundant busbar system.

For internal line to ground faults of the unidirectional breakers in the switchyard, e.g. the DC breaker 50, the DC line 43 shall be disconnected from another DC breaker switchyard at the other end of the line and the DC breakers 51, 53 and 62 shall be opened before the disconnectors of the DC breaker 50 are opened to isolate the faulty device.

The unidirectional DC breakers 62 and 63 are preferably mechanically integrated with the converter 58 to minimize the risk of short-circuit failure between the converter and breaker arrangement. In case of a fault, the DC breakers 50, 52, 53 and 55 must be opened temporarily prior to the disconnectors of the DC breakers 62 and 63.

The optimized DC switchyard shown in FIG. 4 requires six unidirectional DC breakers and two bidirectional DC breakers, which are composed of two unidirectional DC breakers with the semiconductor devices conducting in opposite directions. A similar DC switchyard based on bidirectional DC breakers would require 8×2=16 unidirectional DC breakers. Thus, only 62.5% of the semiconductor switches will be required for the optimized DC breaker switchyard resulting in a significant cost reduction and also reduction of energy transfer losses. How these losses are reduced will be apparent to a person skilled in the art, and it may only be mentioned that for transfers between the lines 43 and 45 the transfer losses will be reduced by 50%, but there will be no reduction of transfer losses for energy transfer between the lines 43 and 44. Furthermore, the transfer losses regarding converter 58 power generation or consumption are reduced by 50% corresponding to the losses of one bidirectional DC breaker only.

Figure 5:
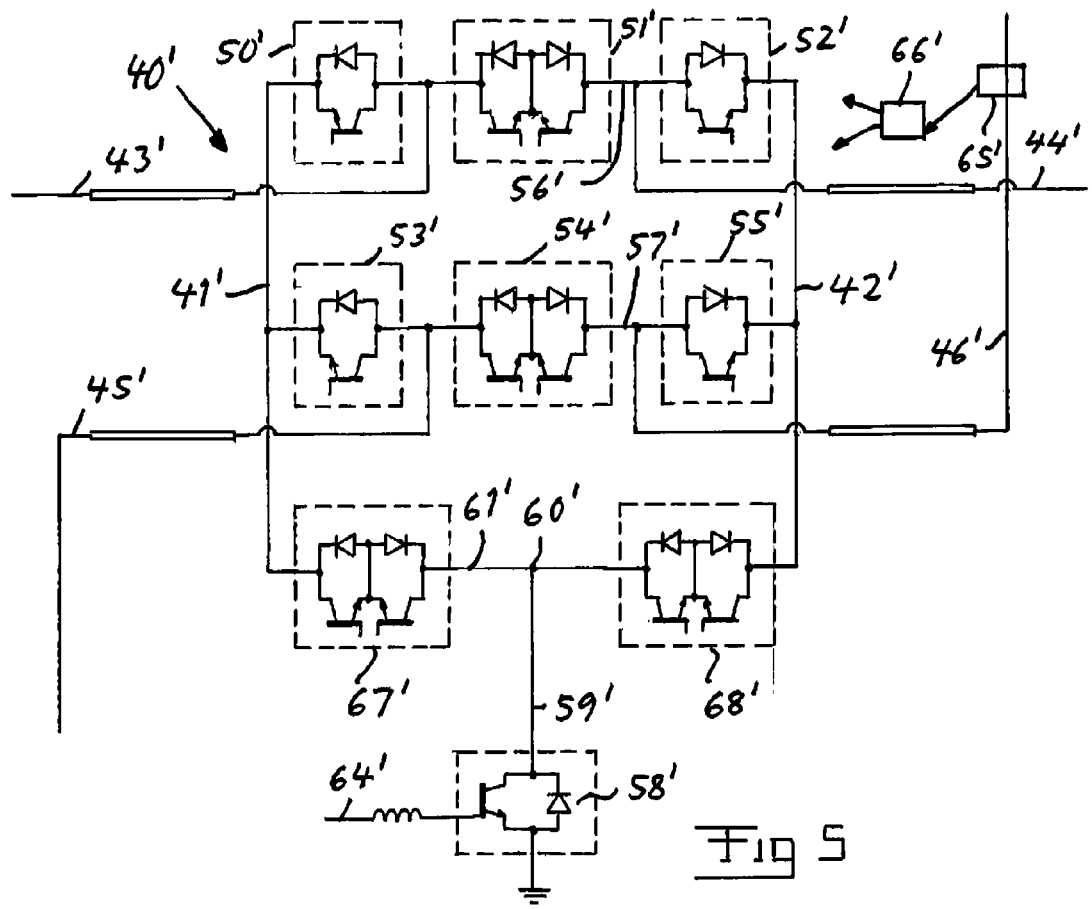
FIG. 5 is a view corresponding to FIG. 4 of a DC switchyard according to a second embodiment of the invention.

FIG. 5 is view corresponding to FIG. 4 of a DC switchyard 40' according to a second embodiment of the invention differing from the first embodiment only by a) the conducting direction of the semiconductor devices of the unidirectional DC breakers 50', 52', 53' and 55', and b) the replacement of the unidirectional DC breaker 62, 63 in the current path 61' by bidirectional DC breakers 67', 68', so that the same reference numerals as used for the first embodiment has been used for this second embodiment with an ' added thereto. Accordingly, the first 50', 53' and second 52', 55' DC breakers have their semiconductor devices directed to conduct away from the first 41' and second 42' busbar. These unidirectional DC breakers 50', 52', 53', 55' are able to disconnect the busbar in the case of a line fault.

The protection scheme is simplified compared to the embodiment shown in FIG. 4. In the case of a DC line fault the DC breakers connected to that line open and isolate the fault. In the case of a DC sided converter fault the DC breakers connected to the converter open and isolate the fault. For internal line to ground faults of the bidirectional DC breakers in the switchyard, e.g. the DC breaker 51', the DC lines 43' and 44' must be opened by the DC switchyards at the other end of these lines and the unidirectional DC breakers 50', 52' are opened to clear the fault similar to a one and a half DC breaker switchyard with bidirectional DC breakers only.

For internal line to ground faults of the unidirectional DC breakers in the DC switchyard, e.g. the DC breaker 50', DC lines 43' and 45' must be opened by the DC switchyards at the other end of these lines and the bidirectional DC breakers 51', 54' and 67' are opened to isolate the fault. A similar protection scheme shall be applied in the case of a busbar fault.

For internal line to ground faults of the DC breakers 67', 68' connected to the converter, e.g. the DC breaker 67', the DC line 43' and 45' must be opened by the DC breaker switchyards at the other end of these lines and the DC breakers 51', 54' and 68' are temporarily opened to isolate the fault.

The second embodiment of the invention requires 75% of the semiconductor device switches compared to a similar DC switchyard based on bidirectional DC breakers. Transfer losses between the DC lines will be the same as for the embodiment according to FIG. 4, while the loss reduction between the DC lines and the converter here amounts to 25% only.

Figure 6:
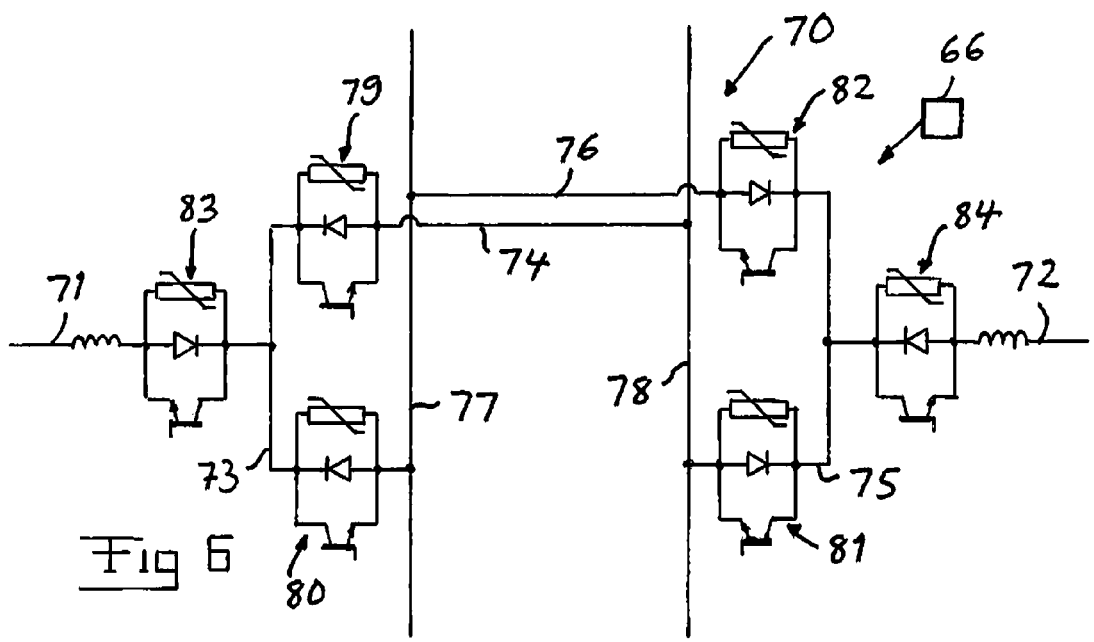
FIG. 6 is a view similar to FIGS. 4 and 5 of a DC switchyard of the type shown in FIG. 2 according to a third embodiment of the invention.

FIG. 6 illustrates a DC switchyard according to a third embodiment of the invention being a so-called two breaker switchyard 70 having for each DC line 71, 72 a separate connection 73, 74 and 75, 76, respectively, to each of said two busbars 77, 78 through one said unidirectional DC breaker 79-82 with the semiconductor devices thereof directed to conduct towards the busbar. Said two connections 73, 74 and 75, 76 are connected to said DC line 71 and 72, respectively, through a further unidirectional DC breaker 83, 84 in common with the semiconductor devices thereof directed to conduct away from the busbars towards the DC line connected thereto. Although it is shown in FIG. 6 how only two DC lines are connected to this two breaker switchyard more DC lines may of course be connected to the busbars of the switchyard in the way shown in FIG. 6.

In such a redundant busbar system the DC line sided unidirectional DC breaker 83, 84 is opened during a fault on the DC line 71 and 72, respectively. In the case of a busbar fault, the corresponding unidirectional busbar DC breaker is opened, so that for instance in the case of a fault on the busbar 78 the breakers 79 and 81 are opened.

This solution requires 75% of the semiconductor device switches needed for a similar DC switchyard based on bidirectional DC breakers.

Figure 7:
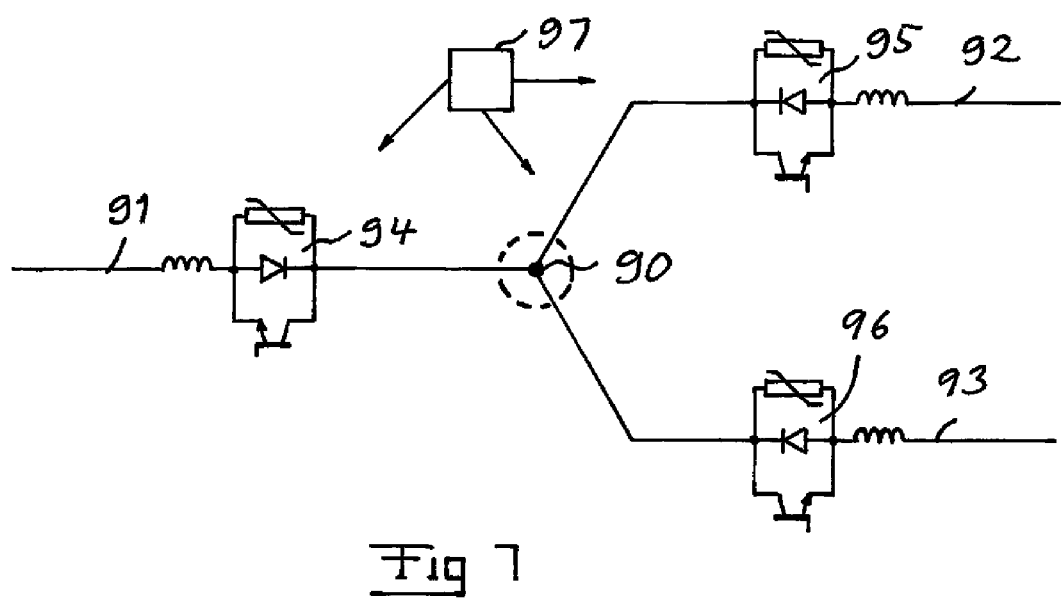
FIG. 7 is a view similar to FIGS. 4-6 of a DC switchyard according to a fourth embodiment of the invention.

FIG. 7 illustrates a DC switchyard according to a fourth embodiment of the invention having only one busbar 90 in the form of a DC grid node to which three DC lines 91-93 are connected through one said unidirectional DC breaker 94-96 each with a semiconductor device thereof directed to conduct away from the busbar 90. Such a DC switchyard configuration may for instance be used for feeding electric power through one DC line 91 from a location, such as in the north of Sweden, where electric power is generated, in two different directions, such as towards the south of Sweden by the DC line 92 and to Norway through the DC line 93. Accordingly, the DC switchyard is used to branch the electric power in two different directions. A control unit 97 is arranged and configured to open the respective DC breaker 94-96 would a fault occur in the corresponding DC line 91-93.

In common with the embodiments of the invention described above careful mechanical design and indoor installation of the DC breakers and other switchyard equipment is recommended for diminishing the risk of pole to ground faults within the DC switchyard.

The invention is of course not in any way restricted to the embodiments described above, but many possibilities to modifications thereof will be apparent to a person with ordinary skill in the art without departing from the scope of the invention as defined in the appended claims.

It is of course within the scope of the invention to replace some of the unidirectional DC breakers in the high voltage DC switchyard embodiments described above by bidirectional DC breakers. The DC breakers may be formed as hybrid breakers combining mechanical switches and semiconductor switches or combinations of a semiconductor based breaker and a mechanical breaker.

The invention claimed is:

1. A high voltage DC switchyard comprising:
    at least one busbar,
    at least two DC lines each connected to said at least one busbar through DC breakers comprising a section of at least one semiconductor device of turn-off type and a rectifying member connected in anti-parallel therewith,
    means configured to detect occurrence of a fault current in connection with said busbar or DC lines, and
    a control unit configured to control said DC breakers for protecting equipment connected to said busbar and/or DC lines upon occurrence of a said fault current,
    wherein
    at least one said DC line is connected to at least one said busbar through a unidirectional said DC breaker,
    said DC switchyard has two busbars and being a one and half breaker switchyard having three said DC breakers per two said DC lines, a first DC breaker connecting a first of the DC lines to a first of said busbars, a second DC breaker connecting a second of the DC lines to a second of said busbars and a third DC breaker in a current path interconnecting the first and second DC breakers, where the first and second DC breakers are said unidirectional DC breakers and said third DC breaker is a bidirectional DC breaker having at least two sections connected in series and with semiconductor devices thereof with opposite conducting directions,
    wherein
        said first and second DC breakers have the semiconductor devices thereof directed to conduct in the direction towards the first and second busbar, respectively, and that said control unit is configured to control said first or second DC breaker to open for disconnecting the respective DC line from the respective busbar in the case of occurrence of a fault of that busbar, or
        said DC breakers connecting the DC lines to a said busbar have their semiconductor devices directed to conduct away from said busbar, respectively, and that said control unit is configured to control these DC breakers to open for disconnecting said busbar in the case of a fault of a line connected to that busbar through this DC breaker.

2. Said DC switchyard according to claim 1, wherein each said DC line is connected to at least one said busbar through a said unidirectional said DC breaker.

3. Said DC switchyard according to claim 1, wherein the DC lines connected to the busbar are opened at the other end in the case of internal line to ground faults in the switchyard when said DC breakers connecting the DC lines to a said busbar have their semiconductor devices directed to conduct away from said busbar followed by opening of the correspding Dc breakers.

4. Said DC switchyard according to claim 1, wherein in the case of a DC line fault on a DC line connected to a busbar, the unidirectional DC breakers of other DC lines connected to the busbar as well as the bidirectional third DC breaker of the DC line are opened, when said first and second DC breakers have the semiconductor devices directed to conduct in the direction towards the first and second busbar.

5. Said DC switchyard according to claim 1, wherein said DC switchyard comprises an AC/DC converter, such as a Voltage Source Converter, with the DC-side thereof connected to a mid point of a current path interconnecting said two busbars and connected to these busbars through a said DC breaker each on opposite sides of said mid point in said current path.

6. Said DC switchyard according to claim 5, wherein said DC breakers connecting said converter to the busbars are unidirectional DC breakers with the semi-conductor devices thereof directed to conduct towards the respective busbar, and that the control unit is configured to control the respective DC breaker to open for disconnecting the converter from a busbar upon occurrence of a fault of that busbar.

7. Said DC switchyard according to claim 5, wherein said DC breakers connecting the converter to the respective busbar are bidirectional DC breakers.

8. Said DC switchyard according to claim 1, wherein each said section of said DC breakers has a plurality of said semiconductor devices connected in series and jointly controllable through said control unit.

9. Said DC switchyard according to claim 1, wherein said semiconductor device/devices is/are an IGBT/IGBTs, a GTO/GTOs or an IGCT/IGCTs.

10. Said DC switchyard according to claim 1, wherein said DC switchyard is configured to interconnect DC lines intended to be on a voltage level of $\geq 10$ kV, 10 kV-1000 kV, 100 kV-1000kV or 300 kV-1000 kV with respect to ground.

11. A plant for transmitting electric power through High Voltage Direct Current,
    wherein it is provided with at least one DC switchyard according to claim 1.

12. A high voltage DC switchyard comprising:
    at least one busbar,
    at least two DC lines each connected to said at least one busbar through DC breakers comprising a section of at least one semiconductor device of turn-off type and a rectifying member connected in anti-parallel therewith, means configured to detect occurrence of a fault current in connection with said busbar or DC lines, and a control unit configured to control said DC breakers for protecting equipment connected to said busbar and/or DC lines upon occurrence of a said fault current, wherein at least one said DC line is connected to at least one said busbar through a unidirectional said DC breaker, in that said DC switchyard has two busbars and is a two breaker switchyard having for each said DC line a separate connection to each of said two busbars through one said unidirectional DC breaker with the semiconductor devices thereof directed to conduct towards the busbar, and that said two connections are connected to said DC line through a further unidirectional DC breaker in common with the semiconductor devices thereof directed to conduct away from the busbars towards the DC-line.

13. Said DC switchyard according to claim 12, wherein said control unit is configured to control said further unidirectional DC breaker in common to open for disconnecting the DC line from the DC switchyard upon occurrence of a fault of that DC line.

14. Said DC switchyard according to claim 12, wherein said control unit is configured to control said unidirectional DC breaker of one of said two connections to open for disconnecting a said busbar associated with that connection upon occurrence of a fault of that busbar.

15. Said DC switchyard according to claim 12, wherein it comprises an AC/DC converter, such as a Voltage Source Converter, with the DC-side thereof connected to a mid point of a current path interconnecting said two busbars and connected to these busbars through a said DC breaker each on opposite sides of said mid point in said current path.

16. Said DC switchyard according to claim 15, wherein said DC breakers connecting said converter to the busbars are unidirectional DC breakers with the semi-conductor devices thereof directed to conduct towards the respective busbar, and that the control unit is configured to control the respective DC breaker to open for disconnecting the converter from a busbar upon occurrence of a fault of that busbar.

17. Said DC switchyard according to claim 15, wherein said DC breakers connecting the converter to the respective busbar are bidirectional DC breakers.

18. Said DC switchyard according to claim 12, wherein each said section of said DC breakers has a plurality of said semiconductor devices connected in series and jointly controllable through said control unit.

19. Said DC switchyard according to claim 12, wherein said semiconductor device/devices is/are an IGBT/IGBTs, a GTO/GTOs or an IGCT/IGCTs.

20. Said DC switchyard according to claim 12, wherein it is configured to interconnect DC lines intended to be on a voltage level of >10 kV, 10 kV-1000 kV, 100 kV-1000kV or 300 kV-1000 kV with respect to ground.

21. A plant for transmitting electric power through High Voltage Direct Current, wherein it is provided with at least one DC switchyard according to claim 12.

* * * * *